(12) United States Patent
Dai et al.

(10) Patent No.: US 11,046,816 B2
(45) Date of Patent: Jun. 29, 2021

(54) METHOD FOR PREPARING FLUORINE-SILICON-CONTAINING POLYPHOSPHATE ESTER AND FLAME RETARDANT EPOXY RESIN

(71) Applicant: XIAMEN UNIVERSITY, Xiamen (CN)

(72) Inventors: Lizong Dai, Xiamen (CN); Ting Chen, Xiamen (CN); Cheng Liu, Xiamen (CN); Shicheng Wang, Xiamen (CN); Guorong Cehn, Xiamen (CN); Conghui Yuan, Xiamen (CN); Yiting Xu, Xiamen (CN); Birong Zeng, Xiamen (CN); Wei'ang Luo, Xiamen (CN); Kaibin He, Xiamen (CN)

(73) Assignee: Xiamen University, Xiamen (CN)

( * ) Notice: Subject to any disclaimer, the term of this patent is extended or adjusted under 35 U.S.C. 154(b) by 173 days.

(21) Appl. No.: 16/463,697

(22) PCT Filed: Nov. 23, 2017

(86) PCT No.: PCT/CN2017/112578
§ 371 (c)(1),
(2) Date: May 23, 2019

(87) PCT Pub. No.: WO2018/095357
PCT Pub. Date: May 31, 2018

(65) Prior Publication Data
US 2019/0284344 A1    Sep. 19, 2019

(30) Foreign Application Priority Data
Nov. 23, 2016  (CN) .......................... 201611037133.1

(51) Int. Cl.
*C08G 77/24* (2006.01)
*C08G 77/46* (2006.01)
(Continued)

(52) U.S. Cl.
CPC ............. *C08G 77/46* (2013.01); *C07F 9/098* (2013.01); *C07F 9/2458* (2013.01);
(Continued)

(58) Field of Classification Search
CPC .... C07F 7/0872; C07F 7/0889; C07F 7/0838; C08G 77/26; C08G 77/395; C08L 63/00
See application file for complete search history.

(56) References Cited

U.S. PATENT DOCUMENTS 10,844,170 B2 * 11/2020 Dai .................... C08G 59/5033
2004/0034160 A1 * 2/2004 Malik ...................... C08F 8/18
524/588
(Continued)

FOREIGN PATENT DOCUMENTS

CN    101104730 A    1/2008
CN    102634174 A    8/2012
(Continued)

*Primary Examiner* — Margaret G Moore
(74) *Attorney, Agent, or Firm* — Cooper Legal Group, LLC

(57) ABSTRACT

Disclosed are a fluorine-silicon-containing polyphosphate ester and method for preparation thereof, having a chemical structural formula of:

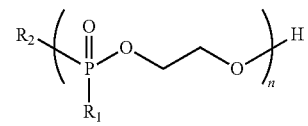

wherein $R_1$ is

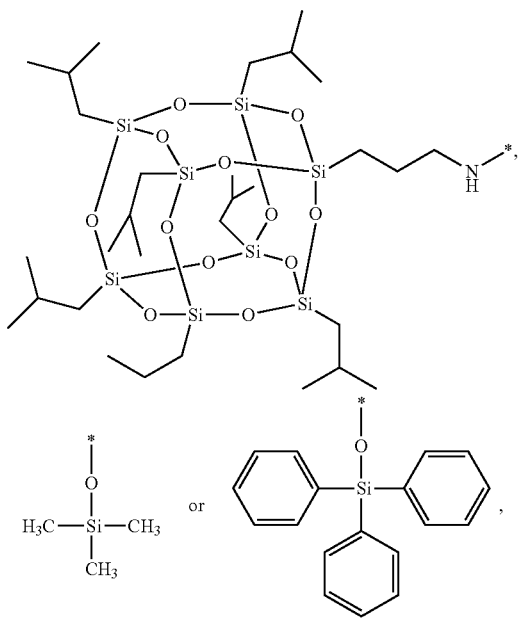

$R_2$ is

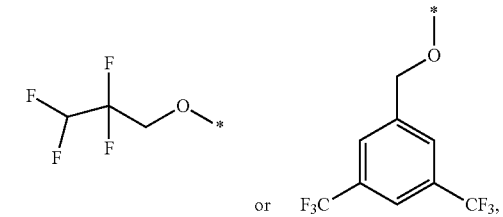

n=10~100. The fluorine-silicon-containing polyphosphate ester of the present invention uses silicon phosphorus and (Continued)

fluorine for improving flame retardancy. Phosphorus catalyzes the system to form a phosphorus-rich carbon layer, performing a protective-layer function and thereby preventing further breakdown of the epoxy resin. The silicon-containing epoxy resin forms a silica-containing carbon layer during the process of combustion, strengthening the carbon-layer structure and further improving the protective function of the carbon-layer. The introduction of elemental fluorine improves the thermal stability of the epoxy resin, thereby improving the flame retardancy performance of the system.

8 Claims, 2 Drawing Sheets

(51) Int. Cl.

| | |
|---|---|
| *C07F 9/09* | (2006.01) |
| *C08G 59/24* | (2006.01) |
| *C08G 59/40* | (2006.01) |
| *C08G 59/50* | (2006.01) |
| *C08G 59/56* | (2006.01) |
| *C08G 77/395* | (2006.01) |
| *C08G 77/42* | (2006.01) |
| *C07F 9/24* | (2006.01) |
| *C08G 79/04* | (2006.01) |
| *C08L 63/00* | (2006.01) |

(52) U.S. Cl.
CPC ....... *C08G 59/245* (2013.01); *C08G 59/4071* (2013.01); *C08G 59/5033* (2013.01); *C08G 59/56* (2013.01); *C08G 77/395* (2013.01); *C08G 77/42* (2013.01); *C08G 79/04* (2013.01); *C08L 63/00* (2013.01); *C08L 2201/02* (2013.01)

(56) References Cited

U.S. PATENT DOCUMENTS

| | | | | |
|---|---|---|---|---|
| 2015/0274991 | A1* | 10/2015 | Lee | C09D 7/20 257/532 |
| 2017/0275437 | A1* | 9/2017 | Diao | C08K 5/549 |
| 2019/0276599 | A1* | 9/2019 | Dai | C08G 59/223 |

FOREIGN PATENT DOCUMENTS

| | | |
|---|---|---|
| CN | 104448830 A | 3/2015 |
| CN | 106750328 A | 5/2017 |
| JP | 2001-247582 A | 9/2001 |

\* cited by examiner

METHOD FOR PREPARING FLUORINE-SILICON-CONTAINING POLYPHOSPHATE ESTER AND FLAME RETARDANT EPOXY RESIN

TECHNICAL FIELD

The invention belongs to the technical field of organic flame retardant materials, in particular to a fluorine-silicone-containing polyphosphate ester and a method for preparation and application thereof.

BACKGROUND ART

Many fire disasters are caused by the combustion of polymer materials due to most of polymer materials are flammable, which bring great harm to people's lives. In order to improve the flame retardancy of polymer materials, the research of flame retardants is in urgent need. However, it is still a challenging task to prepare an efficient flame retardant which can both improve the flame retardant property of materials and develop new properties.

CN201410680503.8 disclosed a phosphorus-silicon composite flame retardant, which used a cage-like tetraphenyl trisilicate phosphorus silsesquioxane as flame retardant for silicone rubber. The phosphorus and silicon containing flame retardant endowed the material with advantages of anti-droplet, heat insulation and smoke suppression. CN201210094955.9 disclosed a phosphorus-silicon-fluorine flame-retardant copolyester film, the phosphorus-silicon-fluorine-containing copolyester chip is obtained by polycondensation and used for improving the flame-retardant property with VTM-0 grade. In this regard, most of flame retardants still have the defects of poor compatibility with the matrix resin, moreover, its single-function as modifying the matrix also limit the application fields of flame retardants.

SUMMARY OF THE INVENTION

The object of the invention is to provide a preparation method of the fluorine-silicon-containing polyphosphate ester.

Another object of the present invention is to provide an application of the fluorine-silicon-containing polyphosphate ester.

The technical scheme provided by the invention is as follows:

A fluorine-silicon-containing polyphosphate ester with a chemical structure formula of

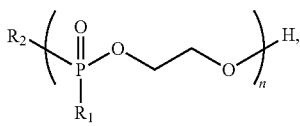

wherein $R_1$ is

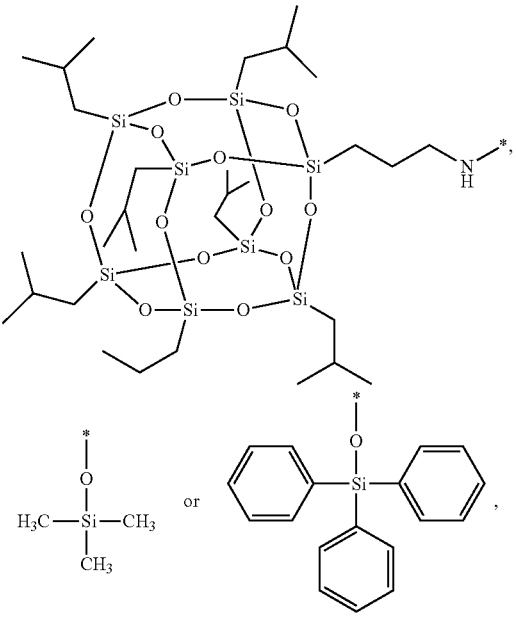

$R_2$ is

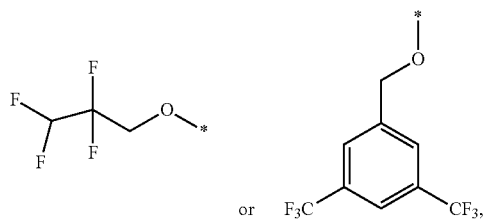

$n=10\sim100$.

The preparation method of the fluorine-silicon-containing polyphosphate ester described above comprises the following steps:

(1) A silicon-containing compound, triethylamine and a first organic solvent are successively added to the reaction vessel under ice bath, then 2-chloro-1,3,2-dioxaphospholane-2-oxide is slowly dripped drop by drop. After 4~12 hours reaction at room temperature, triethylamine hydrochloride is filtered out and the filtrate is repeatedly washed with water for several times. Then organic phase is dried with anhydrous magnesium sulfate and treated with vacuum filtered. Finally silicon-containing cyclic phosphate ester monomer is obtained by after removing solvents by rotary evaporation. The silicon-containing compound mentioned above is trimethylsilanol, triphenylsilanol or aminopropyl polyhedral oligomeric silsesquioxane ($NH_2$—POSS). The mass ratio of 2-chloro-1,3,2-dioxaphospholane-2-oxide to the first organic solvent is 1:5~50. The molar ratio of the silicon-containing compound, triethylamine and 2-chloro-1,3,2-dioxaphospholane-2-oxide is 1:1-2:1-2.

(2) Fluorine-containing compound, tin 2-ethylhexanoate and a second organic solvent are added to the silicon-containing cyclic phosphate ester monomer obtained in step (1), then solution is heated up to 35~80° C. and reacted for 6-12 h. Finally the fluorine-silicon-containing polyphosphate is obtained by rotary evaporating and drying. The fluorine-containing compound mentioned above is 3,5-bis (trifluoromethyl) benzyl alcohol or tetrafluoropropanol. The mass ratio of silicon-containing cyclic phosphate ester monomer to the second organic solvent is 1:5~50. The molar ratio of silicon-containing cyclic phosphate ester monomer, fluorine-containing compound and tin 2-ethylhexanoate is 1:0.01~0.05:0.002~0.01.

In a preferred embodiment of the present invention, the first organic solvent is dichloromethane, toluene or ethyl acetate.

In a preferred embodiment of the present invention, the second organic solvent is dichloromethane, trichloromethane or tetrahydrofuran.

The application of the fluorine-silicon-containing polyphosphate ester in the preparation of flame retardant epoxy resin.

In a preferred embodiment of the present invention, the epoxy resin prepolymer is heated to 70~110° C., where 2-90 wt % fluorine-silicon-containing polyphosphate ester is added and stirred until the solution is uniformly transparent. Then a curing agent 4,4'-diaminodiphenylmethane (DDM) is added according to stoichiometric ratio until completely dissolved, and then the mixture is poured into an aluminum mold, then a curing procedure is set to cure the mixture, a flame retardant epoxy resin is obtained.

Further preferably, the epoxy resin prepolymer is E51 bisphenol A epoxy resin.

Further preferably, the mass ratio of the epoxy resin prepolymer to the curing agent 4,4'-diaminodiphenylmethane is 8:2.02.

Further preferably, the curing procedure is as follows: 120° C. for 4 h, 140° C. for 2 h and 180° C. for 2 h.

The beneficial effects of the present invention are as follows:

1. The flame retardant obtained by ring-opening polymerization of a cyclic phosphate increases the phosphorus content in the system.

2. The fluorine-silicon-containing polyphosphate ester of the present invention uses silicon, phosphorus and fluorine as flame retardant elements. Phosphorus catalyzes the system to form a phosphorus-rich carbon layer, performing a protective-layer function and thereby preventing further breakdown of the epoxy resin. The silicon-containing epoxy resin forms a silica-containing carbon layer during the process of combustion, strengthening the carbon-layer structure and further improving the protective function of the carbon-layer. The introduction of fluorine improves the thermal stability of the epoxy resin, thereby improving the flame retardancy performance of the materials.

3. The fluorine and silicon elements are introduced into the fluorine-silicon-containing polyphosphate ester, because of the atomic particularity of the two elements, the flame retardancy of the epoxy resin can be improved efficiently, as well as reducing the surface energy of the epoxy resin, thus the material could exhibit the hydrophobic property.

4. The preparation method of the invention can adjust the proportion of phosphorus, silicon and fluorine in the system by synthesizing different cyclic phosphate ester monomer or changing the types of initiating cyclic phosphate ester monohydroxy compound.

5. The preparation methods of the present invention utilize the characteristics of ring-opening polymerization of cyclic phosphate esters to prepare macromolecular flame retardants with phosphorus, silicon and fluorine, which can be used for modifying epoxy resin and plays a significant role in improving the flame retardant performance and realizing functionalization of epoxy resin.

DRAWINGS

DETAILED DESCRIPTION

The following is a further description of the technical schemes of the present invention through specific embodiments in conjunction with the accompanying drawings.

In the embodiments described below, the epoxy resin prepolymer is E51 bisphenol A epoxy resin.

Embodiment 1

(1) 8.00 g (9.14 mmol) of aminopropyl polyhedral oligomeric silsesquioxane ($NH_2$—POSS), 1.12 g (11.06 mmol) of triethylamine and 25 mL of dichloromethane were sequentially added to a single-mouth flask under ice bath, and then 1.96 g (13.75 mmol) of 2-chloro-1,3,2-dioxaphospholane-2-oxide was slowly added with a syringe. After reaction at room temperature for 8 h, triethylamine hydrochloride was removed by filtration, then the filtrate was extracted and washed repeatedly with water for several times. The organic phase was dried with anhydrous magnesium sulfate and treated with vacuum filtered. Finally silicon-containing cyclic phosphate ester monomer was obtained by rotary evaporation to obtain.

Figure 1:
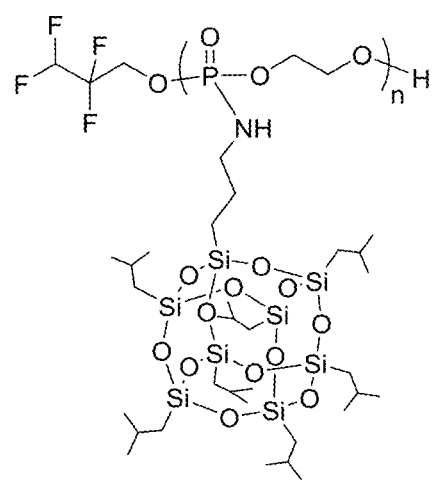
FIG. 1 shows the structure of fluorine-silicon-containing polyphosphate ester in embodiment 1.

(2) 6.08 g (6.20 mmol) of the silicon-containing cyclic phosphate ester monomer obtained in the step (1) was added into a single-mouth bottle, and 13.60 mg (0.10 mmol) of tetrafluoropropanol and 20.00 mg (0.04 mmol) of tin 2-ethylhexanoate and 10 mL of tetrahydrofuran were added and heated to 80° C. After reacting for 6 h, the solvent was rotary evaporated and dried to obtain a fluorine-silicon-containing polyphosphate ester (as shown in FIG. 1).

(3) 20 g of epoxy resin prepolymer was heated to 90° C., 2.78 g of fluorine-silicon-containing polyphosphate ester obtained in step (2) was added and stirred until the mixture was uniformly transparent. Then 5.05 g of DDM was added until it was completely dissolved, the mixture was poured into the aluminium mold and cured at 120° C. for 4 h, at 140° C. for 2 h and at 180° C. for 2 h to obtain the flame retardant epoxy resin.

According to GB/T 2406-2009, the oxygen index of the flame retardant epoxy resin was 32.4%.

Figure 2:
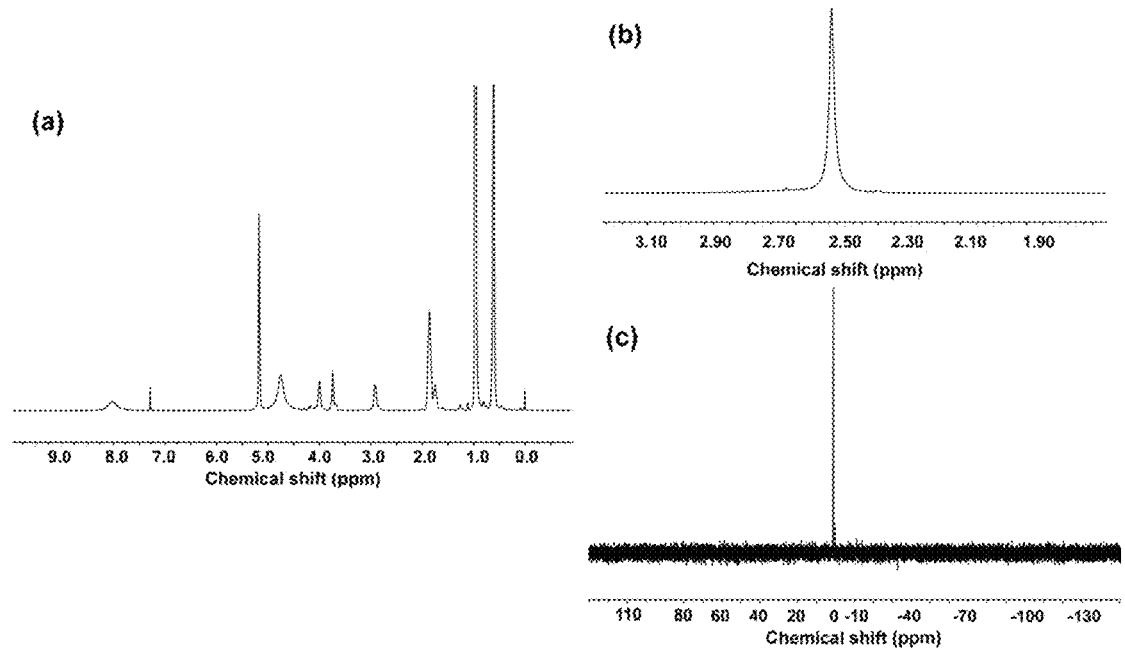
FIG. 2 shows the $^1$H NMR (a), $^{19}$F NMR (b) and $^{31}$P NMR (c) spectra of fluorine-silicon-containing polyphosphate ester in embodiment 1.
Figure 3:
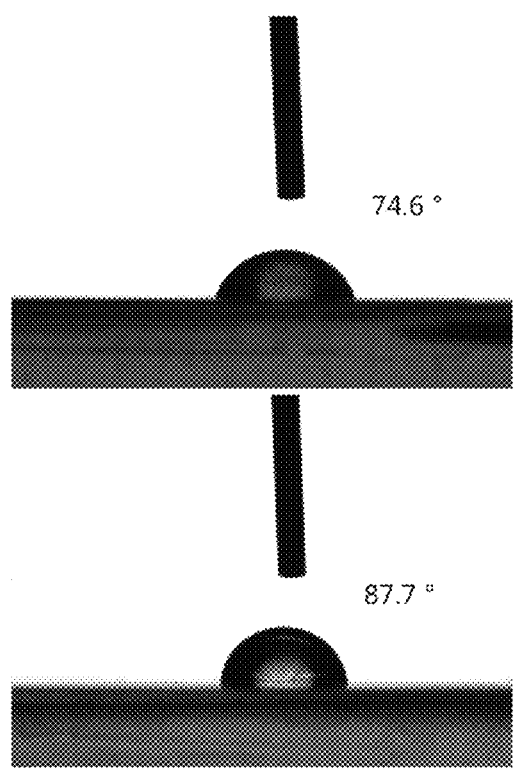
FIG. 3 shows the water surface angle images of flame retardant epoxy resin prepared in embodiment 1 and pure epoxy resin, the above picture is pure epoxy resin, and the below picture is flame retardant epoxy resin prepared in embodiment 1.

According to GB/T 30693-2014, the water contact angle of the flame retardant epoxy resin was 87.7 degrees (as shown in FIG. 2).

Embodiment 2

(1) The synthesis of silicon-containing cyclic phosphate ester monomer was the same as that of embodiment 1.

(2) The synthesis of fluorine-silicon-containing polyphosphate ester was the same as that of embodiment 1.

(3) 20 g of epoxy resin prepolymer was heated to 90° C., and 6.26 g of fluorine-silicon-containing polyphosphate ester obtained in step (2) was added, the mixture was stirred until it was uniformly transparent. Then 5.05 g of DDM was added to the mixture until it was completely dissolved. The flame retardant epoxy resin was obtained by pouring the mixture into the aluminium mold and cured at 120° C. for 4 hours, 140° C. for 2 hours, and 180° C. for 2 hours.

According to GB/T 2406-2009, the oxygen index of the flame retardant epoxy resin is 33.1%.

According to GB/T 30693-2014, the water contact angle of the flame retardant epoxy resin is 90.5 degrees.

Embodiment 3

(1) The preparation of silicon-containing cyclic phosphate ester monomer is the same as that of embodiment 1.

(2) 6.08 g (6.20 mmol) of silicon-containing cyclic phosphate ester monomer obtained in step (1), 24.41 mg (0.10 mmol) of 3,5-bis (trifluoromethyl) benzyl alcohol, 20.00 mg (0.04 mmol) of tin 2-ethylhexanoate and 10 mL of tetrahydrofuran were added into a single-mouth bottle, the reaction temperature was raised to 80° C. and reacted for 6 h. After the reaction, the solvent was rotary evaporated and dried to obtain fluorine-silicon-containing polyphosphate ester.

(3) 20 g of epoxy resin prepolymer was heated to 90° C., 2.78 g of fluorine-silicon-containing polyphosphate ester obtained in step (2) was added and stirred until the mixture was uniformly transparent. Then 5.05 g of DDM was added until it was completely dissolved, then the mixture was poured into the aluminium mold and cured at 120° C. for 4 h, 140° C. for 2 h and 180° C. for 2 h to obtain the flame retardant epoxy resin.

According to GB/T 2406-2009, the oxygen index of the flame retardant epoxy resin is 30.9%.

According to GB/T 30693-2014, the water contact angle of the flame retardant epoxy resin is 87.9 degrees.

Embodiment 4

(1) The preparation of silicon-containing cyclic phosphate ester monomer is the same as that of embodiment 3.

(2) The preparation of fluorine-silicon-containing polyphosphate ester is the same as that of embodiment 3.

(3) 20 g of epoxy resin prepolymer was heated to 90° C., 2.78 g of fluorine-silicon-containing polyphosphate ester obtained in step (2) was added and stirred until the mixture was uniformly transparent. Then 5.05 g of DDM was added until it was completely dissolved, the mixture was poured into the aluminium mold and cured at 120° C. for 4 h, 140° C. for 2 h and 180° C. for 2 h to obtain flame retardant epoxy resin.

According to GB/T 2406-2009, the oxygen index of the flame retardant epoxy resin is 32.7%.

According to GB/T 30693-2014, the water contact angle of the flame retardant epoxy resin is 91.6 degrees.

Embodiment 5

(1) 1.03 g (9.14 mmol) of trimethylsilanol, 1.12 g (11.06 mmol) of triethylamine and 20 mL of dichloromethane were added to a single mouth bottle under ice bath, then 1.96 g (13.75 mmol) of 2-chloro-1,3,2-dioxaphospholane-2-oxide was slowly dripped with a syringe and react for 8 hours. Then triethylamine hydrochloride was removed by filtration, the filtrate was extracted and washed three times with water, the organic phase was dried with anhydrous magnesium sulfate. After vacuum filtered, the solvent was removed by rotary evaporation to obtain silicon-containing cyclic phosphate ester monomer.

(2) 6.08 g (6.20 mmol) of silicon-containing cyclic phosphate ester monomer obtained in step (1) 24.41 mg (0.10 mmol) of 3,5-bis(trifluoromethyl) benzyl alcohol, 20.00 mg (0.04 mmol) of tin 2-ethylhexanoate and 10 mL of tetrahydrofuran were added into a single-mouth bottle, the reaction temperature was raised to 80° C. and reacted for 6 h. After the reaction, the solvent was rotary evaporated and dried to obtain fluorine-silicon-containing polyphosphate ester.

(3) 20 g of epoxy resin prepolymer was heated to 90° C., and 2.78 g of fluorine-silicon-containing polyphosphate ester obtained in step (2) was added, the mixture was stirred until it was uniformly transparent, 5.05 g of DDM was added to the mixture until it was completely dissolved. The flame retardant epoxy resin was obtained by pouring the mixture into the aluminium mold, and cured at 120° C. for 4 hours, 140° C. for 2 hours, 180° C. for 2 hours.

According to GB/T 2406-2009, the oxygen index of the flame retardant epoxy resin is 32.5%.

According to GB/T 30693-2014, the water contact angle of the flame retardant epoxy resin is 89.7 degrees.

It is known to those skilled in the field that the technical scheme of the present invention can still achieve the same or similar technical effect as the above-mentioned embodiments when it changes in the following range, and it still belongs to the scope of protection of the present invention:

A fluorine-silicon-containing polyphosphate ester has a chemical formula structure of:

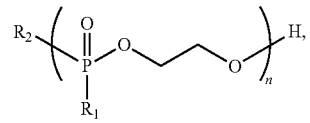

wherein $R_1$ is

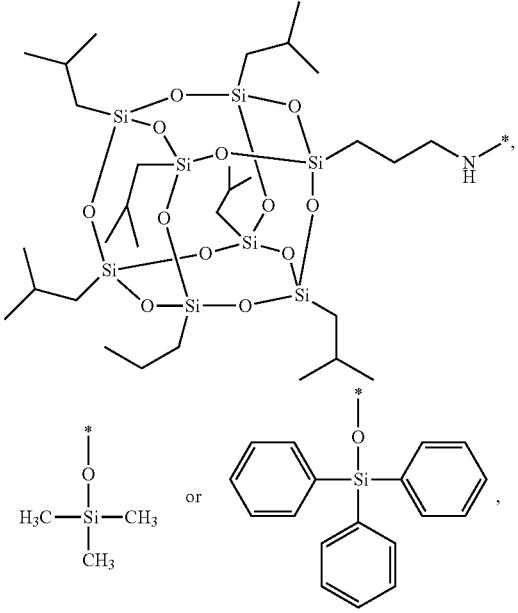

$R_2$ is

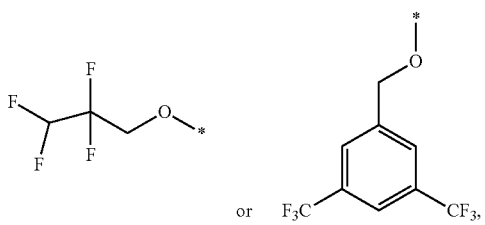 [SMILES: *OCC(F)(F)C(F)F ; *OCc1cc(C(F)(F)F)cc(C(F)(F)F)c1 ; "or"]

n=10~100.

The preparation method of the fluorine-silicon-containing polyphosphate ester described above comprises the following steps:

(1) Silicon-containing compound, triethylamine and a first organic solvent were successively added to the reaction vessel under the ice bath, then 2-chloro-1,3,2-dioxaphospholane-2-oxide is slowly dripped, and reacted for 4~12 hours at room temperature. Then triethylamine hydrochloride is filtered out, the filtrate is repeatedly washed with water for several times. The organic phase is dried with anhydrous magnesium sulfate and treated with filter. Finally the solvent is removed by rotary evaporation to obtain silicon-containing cyclic phosphate ester monomer. The silicon-containing compound mentioned above is trimethylsilanol, triphenylsilanol or aminopropyl polyhedral oligomeric silsesquioxane ($NH_2$—POSS). The mass ratio of 2-chloro-1,3,2-dioxaphospholane-2-oxide to the first organic solvent is 1:5~50. The molar ratio of the silicon-containing compound, triethylamine and 2-chloro-1,3,2-dioxaphospholane-2-oxide is 1:1~2:1~2.

(2) Fluorine-containing compound, tin 2-ethylhexanoate and a second organic solvent are added to the silicon-containing cyclic phosphate ester monomer obtained in step (1), then heated up to 35~80° C. and reacted for 6~12 h. Finally the solvent is rotary evaporated and dried to obtain the fluorine-silicon-containing polyphosphate. The fluorine-containing compound mentioned above is 3,5-bis(trifluoromethyl) benzyl alcohol or tetrafluoropropanol. The mass ratio of silicon-containing cyclic phosphate ester monomer to the second organic solvent is 1:5~5. The molar ratio of silicon-containing cyclic phosphate ester monomer, fluorine-containing compound and tin 2-ethylhexanoate is 1:0.01~0.05:0.002~0.01.

The first organic solvent is dichloromethane, toluene or ethyl acetate. The second organic solvent is dichloromethane, trichloromethane or tetrahydrofuran.

The application of the fluorine-silicon-containing polyphosphate ester in the preparation of flame retardant epoxy resin, specifically: the epoxy resin prepolymer is heated to 70~110° C., where 2-90 wt % fluorine-silicon-containing polyphosphate ester is added, and stirred until the mixture is uniformly transparent, then a curing agent (DDM) is added according to stoichiometric ratio until it is completely dissolved. The mixture is poured into an aluminum mold, then a curing procedure was set to cure the mixture, a flame retardant epoxy resin was obtained.

As mentioned above, these are only preferred embodiments of the present invention, so the scope of embodiment of the present invention cannot be limited accordingly. That is, the equivalent changes and modifications made according to the patent scope and description content of the present invention should still be within the scope of the present invention.

The invention claimed is:

1. A method for preparing a fluorine-silicon-containing polyphosphate ester, a chemical formula of the fluorine-silicon-containing polyphosphate ester is:

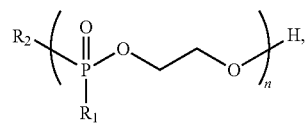

wherein:
$R_1$ is

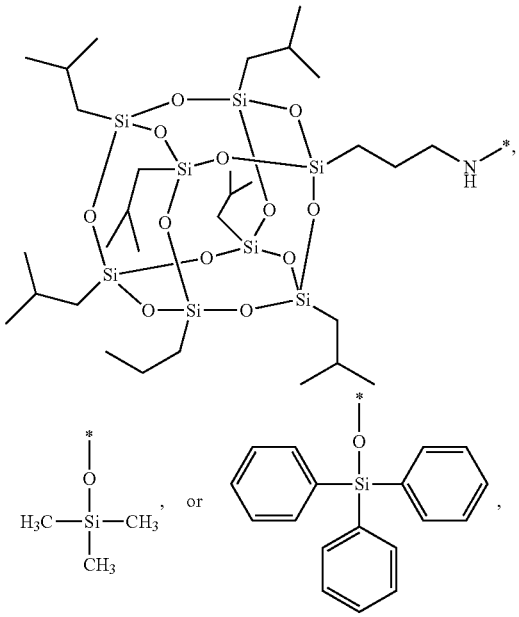

$R_2$ is

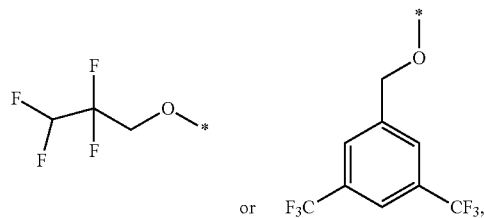

and
n=10-100,
comprising:
(1) successively adding a silicon-containing compound, trimethylamine, and a first organic solvent into a reaction vessel in an ice bath, then dripping 2-chloro-1, 3, 2-dioxaphospholane-2-oxide, and reacting for 4-12 hours at room temperature; filtering to remove triethylamine hydrochloride to obtain a filtrate after the reaction, repeatedly washing the filtrate with water to obtain an organic phase, drying the organic phase with anhydrous magnesium sulfate, and filtering; finally rotary evaporating to remove a solvent of the organic phase to obtain a silicon-containing cyclic phosphate ester monomer; the silicon-containing compound is trimethylsilanol, triphenylsilanol, or aminopropyl polyhedral oligomeric silsesquioxane; a mass ratio of the 2-chloro-1, 3, 2-dioxaphospholane-2-oxide and the first organic solvent is 1:5-50; a molar ratio of the silicon-containing compound, the trimethylamine, and the 2-chloro-1, 3, 2-dioxaphospholane-2-oxide is 1:1-2:1-2; and (2) adding a fluorine-containing compound, tin 2-ethylhexanoate, and a second organic solvent into the silicon-containing cyclic phosphate ester monomer obtained in step (1), to obtain a mixture, then heating up to 35-80° C. and reacting for 6-12 hours; finally rotary evaporating and drying to remove a solvent of the mixture to obtain the fluorine-silicon-containing polyphosphate ester; the fluorine-containing compound is 3,5-bis (trifluoromethyl) benzyl alcohol or tetrafluoropropanol;

a mass ratio of the silicon-containing cyclic phosphate ester monomer and the second organic solvent is 1:5-50, a molar ratio of the silicon-containing cyclic phosphate ester monomer, the fluorine-containing compound, and the tin 2-ethylhexanoate is 1:0.01-0.05:0.002-0.01.

2. The method according to claim 1, wherein the first organic solvent is dichloromethane, toluene or ethyl acetate.

3. The method according to claim 1, wherein the second organic solvent is dichloromethane, trichloromethane or tetrahydrofuran.

4. A flame retardant epoxy resin comprising the fluorine-silicon-containing polyphosphate ester prepared by the method according to claim 1.

5. The flame retardant epoxy resin according to claim 4 prepared by a method, the method comprising: heating an epoxy resin prepolymer to 70-110° C., adding the fluorine-silicon-containing polyphosphate ester to the epoxy resin prepolymer to obtain a second mixture in which 2-90 wt % of the second mixture is the fluorine-silicon-containing polyphosphate ester, and stirring until the second mixture is uniformly transparent; then adding a curing agent 4,4'-diaminodiphenylmethane (DDM) according to a stoichiometric ratio until the curing agent DDM is completely dissolved, pouring the second mixture into an aluminum mold, and then setting a curing procedure to cure the second mixture to obtain the flame retardant epoxy resin.

6. The flame retardant epoxy resin according to claim 5, wherein the epoxy resin prepolymer is E51 bisphenol A epoxy resin.

7. The flame retardant epoxy resin according to claim 5, wherein a mass ratio of the epoxy resin prepolymer and the curing agent 4,4'-diaminodiphenylmethane is 8:2.02.

8. The flame retardant epoxy resin according to claim 5, wherein the curing procedure comprises:
curing at 120° C. for 4 hours,
curing at 140° C. for 2 hours, and
curing at 180° C. for 2 hours.

* * * * *